J. BECKER.
METHOD OF ADJUSTING AND REGULATING AUTOMATICALLY FOCUSED ENLARGING OR COPYING CAMERAS.
APPLICATION FILED FEB. 9, 1910. RENEWED OCT. 3, 1913.
1,103,343.
Patented July 14, 1914.
5 SHEETS—SHEET 3.
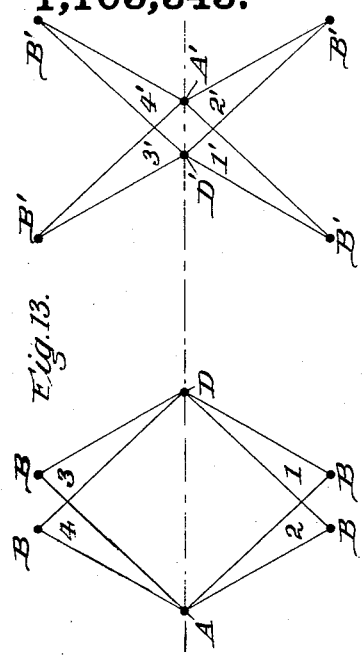
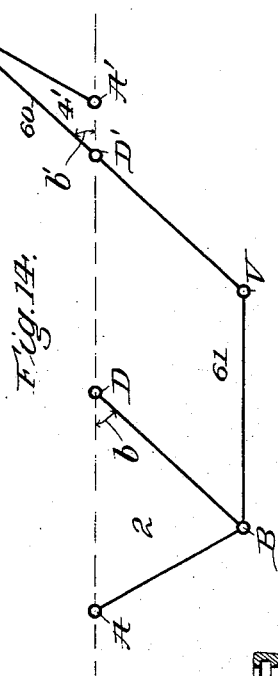
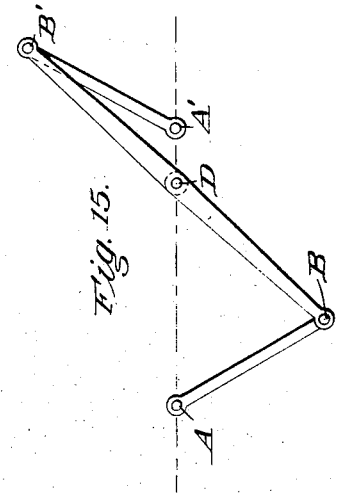
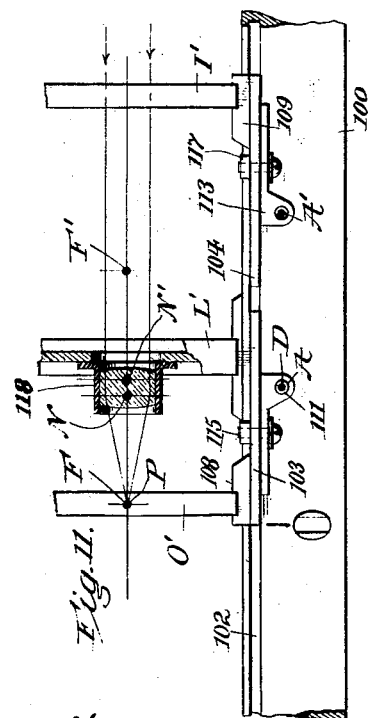
Witnesses:
Inventor:
Joseph Becker
By Dodge and Sons,
Attorneys.

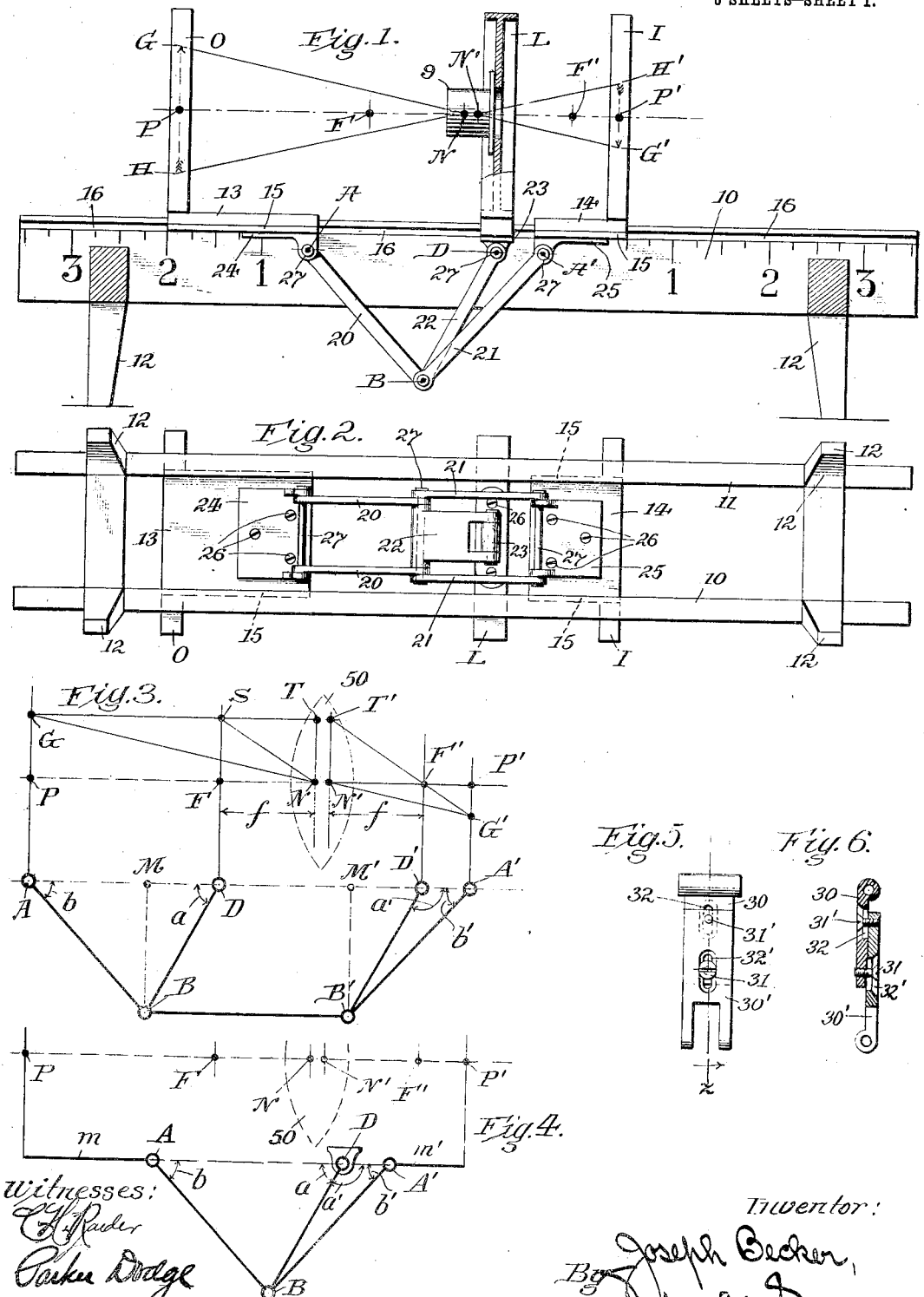

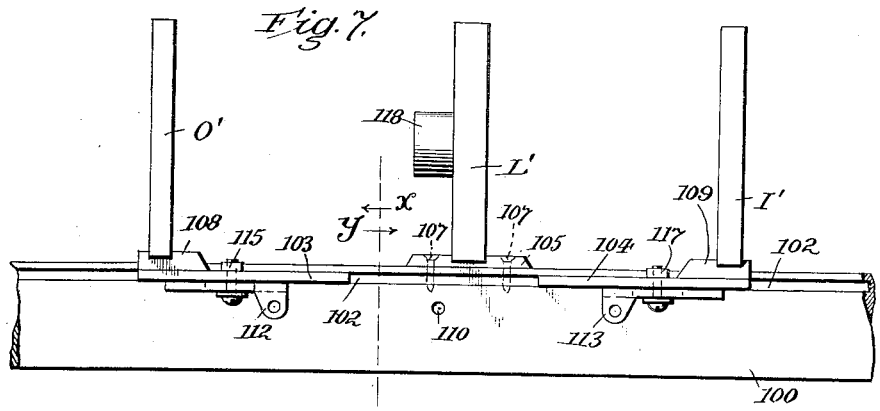
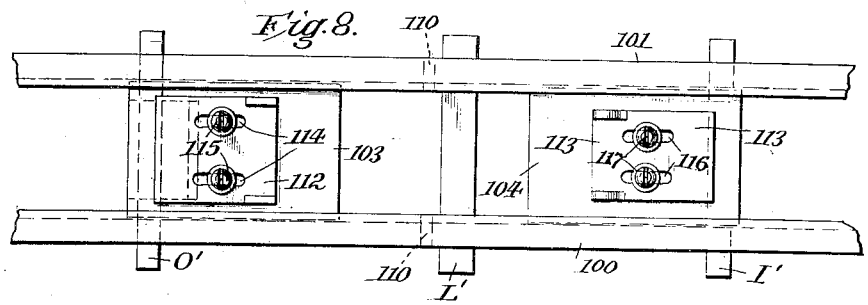
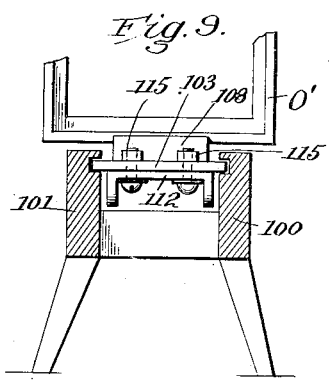
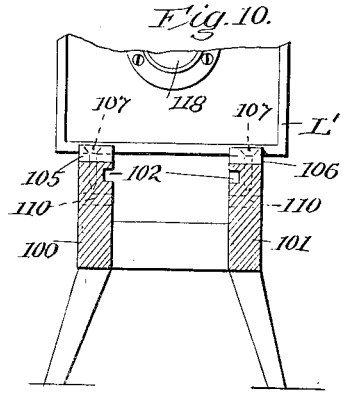

J. BECKER.
METHOD OF ADJUSTING AND REGULATING AUTOMATICALLY FOCUSED ENLARGING OR COPYING CAMERAS.
APPLICATION FILED FEB. 9, 1910. RENEWED OCT. 3, 1913.
1,103,343.
Patented July 14, 1914.
5 SHEETS—SHEET 4.
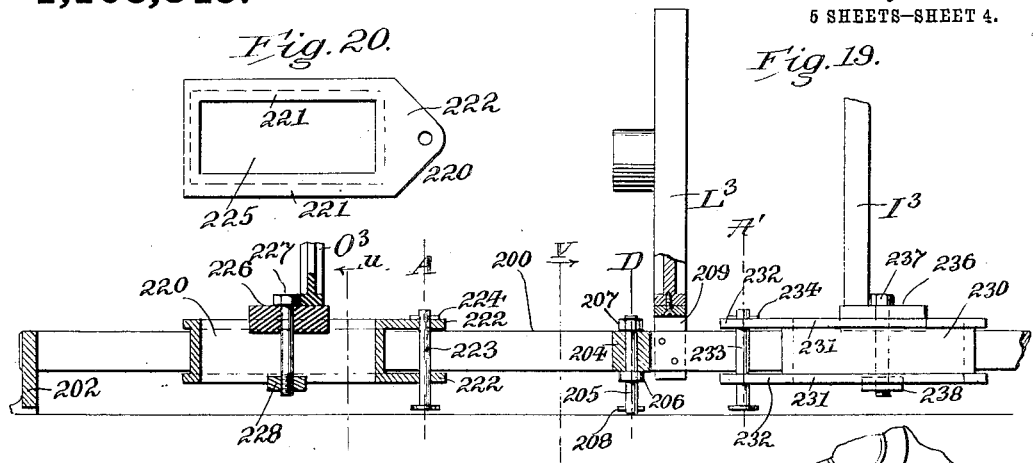
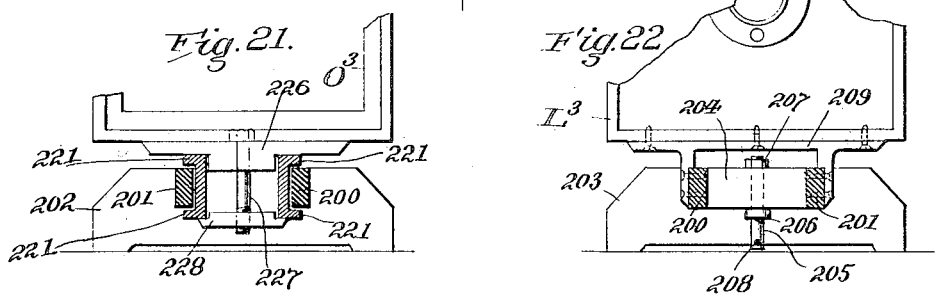
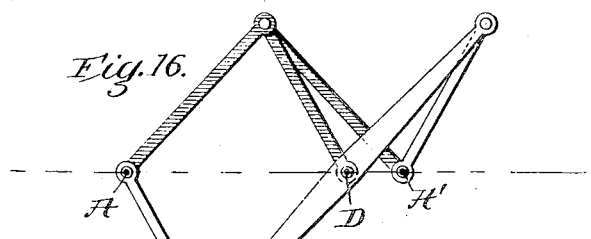
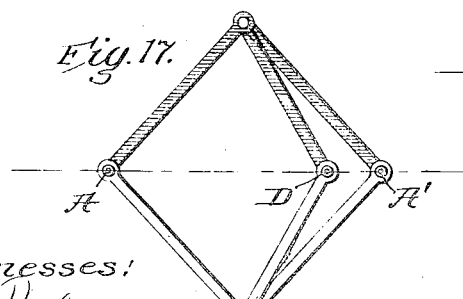
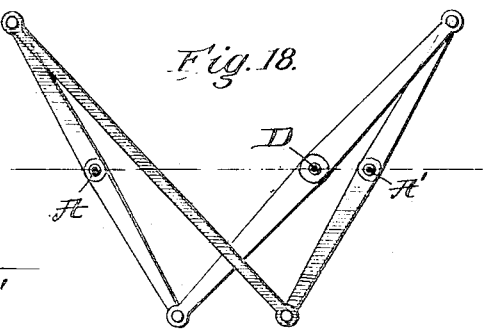
Witnesses:
Inventor:
Joseph Becker,
By Rodgers and Rodgers
Attorneys.

J. BECKER.
METHOD OF ADJUSTING AND REGULATING AUTOMATICALLY FOCUSED ENLARGING OR COPYING CAMERAS.
APPLICATION FILED FEB. 9, 1910. RENEWED OCT. 3, 1913.
1,103,343.
Patented July 14, 1914.
5 SHEETS—SHEET 5.
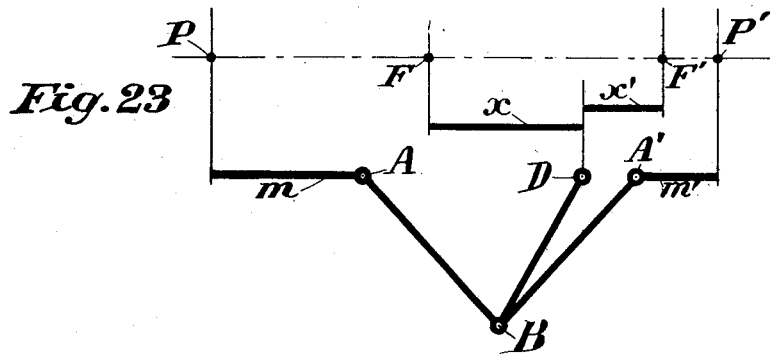
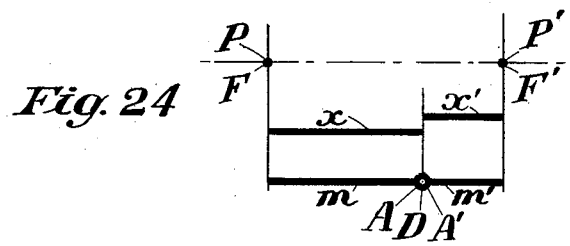
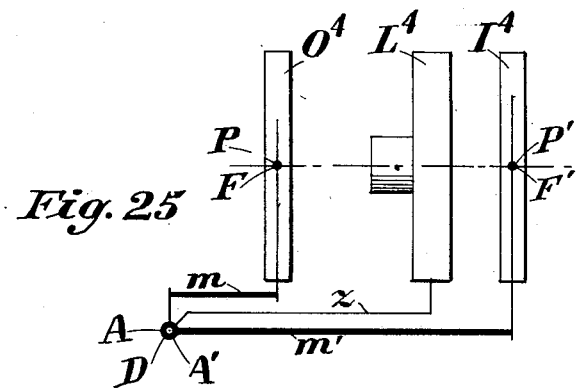
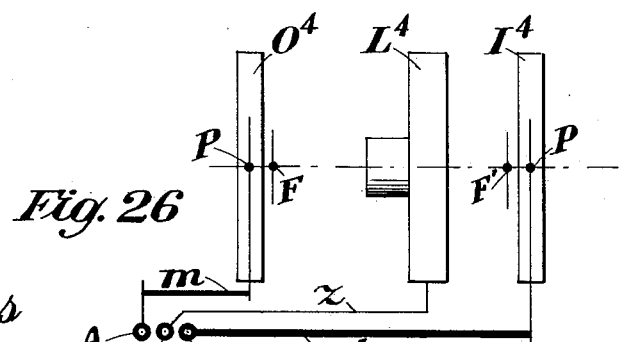
Witnesses
Horace A. Dodge
C. H. Raeder
Inventor
Joseph Becker

UNITED STATES PATENT OFFICE.

JOSEPH BECKER, OF WASHINGTON, DISTRICT OF COLUMBIA.

METHOD OF ADJUSTING AND REGULATING AUTOMATICALLY-FOCUSED ENLARGING OR COPYING CAMERAS.

1,103,343. Specification of Letters Patent. Patented July 14, 1914.

Original application filed July 10, 1905, Serial No. 269,048. Divided and this application filed February 9, 1910, Serial No. 542.842. Renewed October 3, 1913. Seria No. 793,262.

*To all whom it may concern:*

Be it known that I, JOSEPH BECKER, a citizen of the United States, residing at Washington, in the District of Columbia, have invented certain new and useful Improvements in Methods of Adjusting and Regulating Automatically-Focused Enlarging or Copying Cameras, of which the following is a specification.

My invention relates to so-called copying or enlarging cameras, or cameras which comprise three essential parts, to wit: a lens frame or other means for supporting a lens, an image frame for holding the sensitized surface to be impressed and an object frame for holding the illuminated original, drawing, print, negative or other object to be copied or projected. The sensitized surface or image plane bears a certain fixed relation to the image frame, and similarly the object plane bears a fixed relation to the object frame; and as this object plane may also serve as image plane the two planes may be jointly referred to as the image planes. When these image planes are in proper relation to the lens, they coincide with conjugate foci of the lens; and, therefore, to any given relative position of lens and image plane on the one side of the lens, corresponds only one certain relative position of lens and image plane on the other side and this correct position is found by the process of focusing.

In enlarging cameras it is not easy under ordinary conditions to secure a sharp focus by the method of focusing with a ground glass, because the image is generally too faint to be clearly seen and because the image varies rapidly in size during the focusing operation, and this variation in size introduces variations in distinctness which are apt to be mistaken by the operator for variations in sharpness. Moreover, it is often required to make the image of a specified size, especially in copying charts or drawings; but, after the image has been sharply focused, the operator will generally find that it is either smaller or larger than desired. He, therefore, must change the distances and focus again, and this may have to be repeated a number of times before a satisfactory and not the best result is obtained by sacrificing sharpness to secure the exact size or by sacrificing accuracy in size to secure sharpness.

The main object of my invention is to do away with this troublesome tentative and uncertain process of focusing, and to permit of securing in all cases quickly and by positive means the sharpest attainable image of exactly any size that may be required.

To this end my invention consists in connecting the three frames by rods which are pivoted to the frames and to each other in such manner as to keep the image planes always in coincidence with conjugate foci of the lens.

My invention further consists in a very simple method of determining the positions of the frame pivots; also in a type of construction specially adapted to permit of applying such method; and, finally, my invention consists in other features, improvements, parts and combinations hereinafter described or claimed.

The mechanical features are claimed in application Serial No. 269,048, filed July 10, 1905, of which this is a division, the claims of this division being restricted to the method.

In the accompanying drawings: Figure 1 is a side view of a simple form of my invention, certain parts being broken away to show inside construction. Fig. 2 is an inverted plan of the structure of Fig. 1. Fig. 3 is a diagram of another form of my linkage and the lens with which it coöperates, the focal planes being spaced as in Fig. 1. Fig. 4 is a diagram of the linkage of Fig. 1. Fig. 5 is a face view of an adjustable form of link, and Fig. 6 is a section thereof on plane $z$ of Fig. 5. Fig. 7 shows a form adapted to carry out my improved method of properly setting the pivot bearings, the view being similar to Fig. 1, but with the linkage omitted for clearness. Fig. 8 is an inverted plan of the same. Fig. 9 is a section on plane $x y$ of Fig. 7, looking in direction of arrow x; and Fig. 10 is the same section, looking in the direction of arrow y. Fig. 11 is a view similar to Fig. 7, but illustrating the adjustment of one of the frame pivots. Fig. 12 is similar to Fig. 11, showing the linkage and how it is adjusted. Fig. 13 is a diagram of different arrangements of my linkage. Fig. 14 shows a form of linkage in which the image links are the longer links, and Fig. 15 is a simplification thereof. Figs. 16, 17 and 18 show compound forms of the linkage. Figs. 19 to 22 show a modification of the combination shown in Figs. 7 to 12, Fig. 19 being a longitudinal section with the right carriage in side elevation and the extreme right end of the bench broken away; Fig. 20 a plan of the left hand carriage shown separately; Fig. 21 a section on plane $u$ of Fig. 19; and Fig. 22 a section on plane $v$ of Fig. 19. Figs. 23 to 26 are diagrams illustrating the relations existing between connecting point distances as measured from the end-frame image planes, for the end-frame connecting points A, A'; and from the principal focal planes of the lens for the lens frame connecting point D. In the forms of Figs. 1 and 2 L is the lens frame, I is the image frame and O is the object frame. These three frames may be of any preferred construction and a bellows may be provided to connect frames I and L and another to connect frames L and O; but as either or both of these bellows may be in certain cases be dispensed with it is not necessary to show them. The lens frame L is firmly bolted or otherwise fixed on the shears or ways 10 and 11 of a suitable bench having legs 12. The object frame O is rigidly mounted on a carriage 13 and the image frame I is similarly mounted on a carriage 14. Carriages 13 and 14 have tongues 15 adapted to fit and slide in grooves 16 formed on the inner faces of the shears 10 and 11. The three principal frames I, L, O are connected, either directly or indirectly, by my linkage, comprising two equal links 20 and 21 and a shorter link 22. In order that the links shall never interfere in their movements, it is well to construct them so that the lens link 22 shall not move in the same plane as the others; and as a symmetrical construction is preferable the lens link 22 in the present form is made single and swings between the other links 20 and 21, which are made double, as seen in the inverted plan view, Fig. 2. This construction secures all the freedom of motion that may be desired and insures parallel motion of the carriages. The link 22 is hinged to frame L by a hinge or pivot bearing 23, and the links 20 and 21 are similarly hinged to their respective frames by pivot bearings 24 and 25. These different bearings are fastened in place by screws 26. The equal links 20 and 21, being virtually pivoted to the image planes, may be called the image links, and the other link 22, virtually pivoted to the lens, has already been referred to as the lens link. The four pintles of the linkage are designated by 27 and their geometrical axes are indicated in Fig. 1 by dots A, B, A', D. Axes A, D and A' may lie in any plane parallel with the direction of motion of carriages 13 and 14. As before stated, links 20 and 21 are equal. The length A B of the image links 20 and 21 and the length B D of the lens link 22 may have any values such that the difference of their squares shall be equal to the square of the focal length of the lens 9 used, that is, any values satisfying the following equation:

$$\overline{AB}^2 - \overline{BD}^2 = f^2 \quad (1)$$

The lens 9 may be either simple or compound. Its nodal points are indicated at N and N', and its principal foci at F and F', F being the focus of parallel rays from the right and F' the focus of parallel rays from the left. The focal length $f$ of the lens, as well known, is the distance from F to N, or the equal distance from N' to F', and the vertical planes through N and N' are usually designated as the "principal planes." Points P and P' are conjugate foci of the lens.

In order that the linkage and the lens shall coöperate, the linkage must not only satisfy equation (1) above, but the pintles must be so mounted on the frames that, when the frames are in focus on each other, the distance A D shall equal the distance P F and the distance D A' shall equal the distance P' F', or in symbols:

$$AD = PF \quad (2)$$
$$DA' = P'F' \quad (3)$$

Equations (1), (2) and (3) are all satisfied in Fig. 1, as may easily be verified, and they will also be satisfied in any other relative position of the different parts: equation (1) because the lengths of the links are invariable; equation (2) because A and P move equally so that if A D be increased or decreased by any amount, P F will be increased or decreased by exactly the same amount; equation (3) for the same reason as equation (2), that is, because points A' and P' move equally.

*Theory of the device.*—A D being identical with P F, and D A' identical with F' P', it only remains to show that A D and D A' as dimensions of the linkage, vary according to the same law as the distances F P and F' P' of conjugate foci of the lens. In the following demonstration I shall first consider the lens and then the linkage.

Referring to the upper part of the diagram, Fig. 3, in which the lens 50 is represented schematically by dotted lines, the image G' of a point G is formed by following the course of a ray G N directed to the nodal point of incidence N and the course of a ray G T parallel with the axis F F'. The axial ray G N is simply offset by the lens and proceeds after emergence along N' G' parallel with its original direction, N' being the nodal point of emergence. The parallel ray G T meets the first local plane in S and the first principal plane in T which shifts to T' in the second principal plane, and the emergent ray proceeds virtually from T' parallel with S N through F', the second principal focus, on to G'. The figure T S G N, having all its lines parallel to the lines of figure P' F' N' G', is similar to the latter, so that the homologous or corresponding lines of the two figures are proportional, and, therefore, $$\frac{F'P'}{N'F'} = \frac{TS}{SG}$$

Noting that N' F' and T S are both equal to $f$, and that S G is equal to P F, the above equation yields $$\frac{F'P'}{f} = \frac{f}{SG} = \frac{f}{PF}$$

whence $$PF.F'P' = f^2 \quad (4)$$

or $$F'P' = \frac{f^2}{PF} \quad (5)$$

Equation (4) is referred to by French authors as Newton's formula, a practice that it will be convenient to follow in this specification, and that has its justification, as will be seen on referring to page 8 case 4 and Fig. 7 of Newton's "Opticks," London, 1704.

The above direct demonstration on the lines of the modern or Gaussian theory is my own.

The theory of the linkage of Fig. 1 will follow directly from the theory of the linkage of Fig. 3. The linkage of Fig. 3, though less simple, most clearly illustrates all the principles involved, because it connects the image planes A P and A' P' directly to control the displacements of such planes with relation to the lens 50. The lens is here represented diagrammatically in dotted lines, and, whatever its form, is fully determined for the present purposes by the position of its nodal points N and N' and of its principal foci F and F'. At D and D' in the principal focal planes F D and F' D' of the lens are pivoted equal lens links D B and D' B'. At A and A' in the image planes are pivoted equal image links A B and A' B'. The joints B and B' of these two pairs of links are connected by a link B B' equal in length to the distance D D' to form a jointed parallelogram B D D' B'. The lens is thus connected to image plane P by a pair of links D B A and to the conjugate plane P' by a similar pair of links D' B' A', and either pair satisfies equation (1) above. By considering triangle A B D we see that $$\overline{AB}^2 = \overline{BM}^2 + \overline{AM}^2$$

also that $$\overline{BD}^2 = \overline{BM}^2 + \overline{MD}^2$$

Whence, by subtraction:

$$\overline{AB}^2 - \overline{BD}^2 = \overline{AM}^2 - \overline{MD}^2$$
$$= (AM+MD)(AM-MD)$$
$$= AD(AM-MD)$$

and as the last factor (AM—MD) is identical with (A'M'—M'D') or with D' A'

$$\overline{AB}^2 - \overline{BD}^2 = AD.D'A' \quad (6)$$

As the links satisfy equation (1), we have $$\overline{AB}^2 - \overline{BD}^2 = AD.D'A' = f^2$$

whence $$A'D' = \frac{f^2}{AD} \quad (7)$$

Now, assuming any value for the object distance P F, the image distance F' P' by the lens formula (5) above will be $(f^2/PF)$; and, assuming the same value A D equal P F in the linkage, the distance A' D' by the linkage formula (7) will also be $(f^2/PF)$. The linkage will, therefore, always hold plane A' in coincidence with the conjugate focus P' of P.

By leaving the lens 50 and the image planes P and P', as in Fig. 3 and removing link B B', the triangle A B D may be shifted to the right and triangle A' B' D' may be shifted to the left until links B' D' and B D coincide and merge into one link B D, as in Fig. 4, where the points A and A' of the linkage are connected to the image planes by bars $m$ and $m'$. The length of bars $m$ and $m'$ may have any values, except that their algebraic sum must equal the distance D D' of Fig. 3 or the distance F F' in the lens, that is, equal to twice the focal length of the lens, plus the distance N N' between the nodal points. But Fig. 4 just considered has the same horizontal dimensions as Fig. 1, and is the diagrammatic representation of Fig. 1. It is, therefore, clear that if a properly lighted object be mounted in one of the two focal planes P or P' of Fig. 1, its image will be seen sharply focused in the other focal plane, and that this will be so in all positions of the mechanism and frames. If the frames are moved, the diameter of the image will be seen to increase or to decrease, according to the direction of the motion, but its sharpness will remain constant, except in so far as sharpness may be affected by the scale of reduction or enlargement. In the proportions of Figs. 1 and 2 the diameter of the image may be increased up to over three times (7/2) the diameter of the original, and it may be decreased down to less than one third (2/7), giving a range of 4 to 49 or exceeding 1 to 12, that is, the smallest image has a diameter less than one-twelfth of the largest. These are about the limits of the device as shown in Fig. 1, but the range can be increased, if desired, by making the ways 10 and 11 longer and lengthening the links 20, 21, and 22 to correspond. The operator, knowing that the image is sharply focused, has, therefore, nothing to consider but size, if size be of importance to him. He may control the size by direct inspection or measurement of the image, but to avoid this I preferably use a scale. Scales have heretofore been used in enlargement cameras, mainly for the purpose of focusing; but as I focus mechanically I have devised an improved scale that is specially adapted to coöperate with my linkage.

*Scale of enlargement and reduction factors.*—This scale is marked in fixed relation to the lens, in any convenient place, and in the present case on top of the bench or on the outside edge thereof. To save additional illustration it is repeated in Fig. 1 on the inside face of rail 10. The graduation comprises a graduation 1, 2, 3, at the left for the object frame O and a similar graduation 1, 2, 3 at the right for the image frame I, and the numbers indicate enlargement factors. Thus frame O, as seen in the figure, registers with enlargement factor 2, which means that G H is twice G′ H′. Frame I must then register with reduction factor 1/2 of its scale, as seen, to indicate that G′ H′ is one-half of G H. The divisions of the scale, that is, the divisions of the reduction factors, are small, crowded and irregular, and as the linkage permits of dispensing with one scale I prefer to do away with all graduations below 1 on both scales and to set the frames in all cases, whether for enlargement or for reduction, by means of the enlargement factor. That is to say, either scale sets its frame for enlargement and sets the opposite frame, by means of the linkage, for the corresponding reductions. The two enlargement scales, therefore, act as a combined enlargement and reduction scale. This is a great advantage, especially as the steps of the enlargement scales are uniform; that is to say, the distance 1 to 2 equal the distance 2 to 3, and either of these is equal to the focal length of the lens and the steps may be uniformly divided for intermediate values. The principle of the enlargement scale can be demonstrated by Diagram 3, where the enlargement factor $$n = \frac{GP}{G'P'} = \frac{GS}{G'P'} = \frac{PF}{N'F'} = \frac{PF}{f}$$

whence $$PF = nf = AD \quad (8)$$

and in similar manner it can be shown that $$P'F' = \frac{1}{n}f = D'A' \quad (9)$$

The distances for the enlargement factors are, therefore seen to vary in direct proportion to $n$ and the distances for the corresponding reduction factors vary in indirect proportion; the first scale being uniform and well spaced, the latter irregular and crowded. With this improved scale and the linkage, the operator pays no attention whatever to the image. He directly inserts his sensitive paper, plate or film and selects his factor of enlargement or reduction, say, for instance 2 1/2. If the factor is an enlargement factor, it is the image frame I that he sets at 2 1/2, and if it be a reduction factor, it is the object frame O that he sets at 2 1/2. Then he exposes and without ever having seen the image he knows that he has secured the sharpest attainable image of exactly the size desired.

In copying drawings or charts it is necessary to first make a negative from which the final positive prints are made, and to reduce expense the negative is often made very small. My device is well adapted to make both the negative and the positive, and in this case the combined enlargement and reduction scale is a very great convenience.

*Adjustments.*—If lenses could easily be made of a certain focal length, there would be no difficulty in manufacturing the device as just described. It is well known, however, that even the highest price lenses are never expected to be of exactly their intended focal length. In assembling the linkage and camera elements in the factory, it is, therefore, necessary to allow for departures that may be present in the focal length of the lens. A number of different methods may be followed: The simplest, to be given later, requires special features of construction not present in the structure of Figs. 1 and 2, and I shall, therefore, first give a method that can be applied to the structure of Figs. 1 and 2. Bearing 23 is supposed to be fastened in place, that is, wherever convenient, but bearings 24 and 25 are supposed to be unmounted. If bearing 23 be mounted midway between the principal planes N and N' of the lens, the other two bearings will have to be at equal distances from their respective image planes, and the construction will be symmetrical; but symmetry is not essential in my device so that bearings 23 may be mounted in any desired position closer to one of the two focal planes F or F' than to the other, making the structure unsymmetrical. In Fig. 1, therefore, bearing 23 having preferably been mounted in the most convenient place directly on the lens frame; first, measure the focal length of the lens by any known method; second, construct the linkage to satisfy equation (1); third, temporarily clamp one of the frames O or I to the bed and mount a test object in its image plane, and sharply focus the other frame, clamping it also; fourth, measure any line G H in the object and the length G' H' of its image to calculate $n$, the factor of enlargement; fifth, mount and fasten bearing 24 so as to satisfy equation (8); sixth, fasten bearing 25 to satisfy equation (9); seventh, mount the linkage which should now fit exactly. The second step above can be left to the last. That is, bearings 23, 24 and 25 are all fastened as indicated above; then links 20 and 21 are mounted and the distance B D is measured to construct link 22. The short link 22 may also be made adjustable in length in any suitable manner, as indicated, for instance, in Figs. 5 and 6, by making it of two parts 30, 30'. Part 30 is threaded near one end to receive a screw 31 and part 30' is similarly threaded to receive a screw 31'. Slots 32 and 32' permit the parts to slide upon each other when the screws are loosened. When link 22 is thus made adjustable, it is no longer necessary to measure the distance B to D, as proposed above, for the screws 31, 31' are simply loosened enough to permit the short link to extend or contract freely so it may be inserted and mounted in place and then firmly clamped to the length that it has automatically assumed during the mounting operation.

The adjustment might be made in the two long links or elements A B and B C, instead of in the short link or element B D, but adjustment of the short link is simpler.

*Improved form.*—It is seen that the manufacture of accurately operative devices of the form of Figs. 1 and 2 involves considerable trouble, even when the adjustable lens link of Figs. 5 and 6 is used. I have fortunately discovered a method of adjustment that permits of dispensing with all measurements, dispensing even with the measurement of the focal length of the lens; but this method involves a novel principle of construction which consists in so forming the device that the bearing of axis D shall admit, or be admitted by, either of the other bearings in such manner that the axes A and D or the axes A' and D may be brought into exact coincidence.

Referring to Fig. 1, it will be remembered that, when the apparatus is in perfect adjustment, the distance F' P' is always equal to D A' and that the distance F P is always equal to A D. If F' P' could be reduced to zero, D A' would also become *nil*, and if F P could be reduced to zero, A D would become *nil*. That is, the hinges would interpenetrate so as to have their axes in coincidence. But, when F P is *nil*, frame O is in focus on parallel rays from the right, and, when F' P' is *nil*, frame I is in focus on parallel rays from the left. My method of adjustment, therefore, consists in first fixing one of the axes, say, axis D, and then using it as a guide or fiducial point for setting the other two axes, by focusing on infinity. A structure which permits of applying this method is shown in Figs. 7, 8, 9, 10, 11 and 12. The object frame O', the image frame I', the lens frame L', and the bench comprising guide rails 100 and 101 are all substantially as in Fig. 1, but the groove or slide way 102 formed in the guide rails is continued without obstruction under the lens frame L'. To insure a clear passageway for the carriages 103, 104, frame L' is, furthermore, raised on blocks 105, 106, which are fastened to rails 100 and 101 by screws 107. Frame O' is rigidly mounted on its carriage 103 by means of a block 108, and frame I' on its carriage by a block 109. The bearing for the lens axis D is simply formed by a bore 110 in guide rails 100, 101, as best seen in Fig. 7, to admit a pin 111, best seen in Figs. 11 and 12. The bearing 112 for the object axis A and the bearing 113 for the image axis C may be exactly as in Fig. 1, but I preferably mount them as seen in Fig. 8; that is, I form in bearing 112 a pair of slots 114 to admit screw bolts 115. Bearing 113 has similar slots 116 to admit bolts 117. The linkage comprising the image links 120, 121 and the lens link 122, 123 (Fig. 12) is exactly as in Fig. 1, but with the lens link adjustable as in Figs. 5 and 6.

Having mounted the lens 118 in frame L', the adjustments are made as follows: The links 120, 121, and 122, 123 are removed so as to leave the structure as in Fig. 7. Frame O' is then slid up, as in Fig. 11, to bring the bore of its bearing 112 in alinement with the bore 110, and pin 111 is inserted to secure perfect coincidence of axes A and D, as indicated in Fig. 11. Screws 115 are now loosened and frame O' is sharply focused on a distant test object to the right, that is, on parallel rays from the right. This brings image plane P into exact coincidence with the principal focal plane F of the lens. Screws 115 are then tightened and axis A is thus firmly and accurately fixed in proper relation to its image plane P, at a distance therefrom equal to the distance of the lens axis D from the left focal plane F. The bar $m$ of Fig. 4, therefore, represents not only the distance of A from its plane P, but also the distance $x$ (Fig. 23) of D from plane F. Pin 111 is withdrawn and frame I' is now pushed in to bring the bore of its bearing 113 in alinement with bore 110, and pin 111 is again inserted to secure perfect coincidence of axes A' and D. The bearing 113 is loosened, frame I' is then focused on left infinity to bring its image plane P' into coincidence with the principal focal plane F' of the lens. Screws 117 are then tightened and axis A' is thus firmly and accurately fixed in proper relation to its image plane P', at a distance $m'$ (Fig. 4) which equals the distance $x'$ (Fig. 23) of the lens pivot D from the right hand focal plane F'. The algebraic sum $(m+m')$ being identical with the sum of the distances $x$ and $x'$ of D from the two focal planes is thus again seen to equal F F', as before stated. The reason for saying "algebraic sum" is that either $m$ or $m'$ must be negative when axis D is situated externally of the focal planes F, F' instead of between them, as will be explained below in describing Fig. 25 where $m$ is negative. The linkage is now mounted as indicated in full lines, Fig. 12, that is, with the lens link entirely open to leave the carriages 103, 104 perfectly free. Frame O' is now set in any position, say, in the position seen in Fig. 12, and is preferably clamped in any suitable manner. A test object is mounted in its image plane P and frame I' is then sharply focused on P and similarly clamped. The lower member 123 of the lens link is now turned up against member 122 and these two members are firmly secured together by inserting the screw 124. The linkage now satisfies equation (1) because the product A D. D A' equal to $$\overline{AB}^2 - \overline{BD}^2$$

by equation (6) is identical with P F. F' P' or equal to $f^2$. The device, therefore, satisfies all the theoretical conditions and frames I' and O' may be unclamped for use.

As it may be inconvenient to have test objects at both right and left infinity, it will generally be easier to turn the apparatus end for end and focus on only one well selected distant object, and if any difficulty be experienced in finding such an object, the focusing may be done on the parallel rays produced by a collimator. If special refinements be used in focusing to adjust the camera, the camera will give the same degree of accuracy when used to make exposures.

No measurements and no calculations are required with the apparatus of Figs. 7 to 12. Its different parts are constructed and simply assembled ready for adjustment, and the adjustment is made by only three focusing operations, such as made with an ordinary camera, without paying any attention either to size of the image, or to focal length, or to any other dimensions. The apparatus as made in Figs. 7 and 12 may, therefore, be put on the market without a lens, with instructions such as those above, for correctly adjusting it. As it is better not to make the device excessively large and to make the latitude of adjustments small, it is preferred to manufacture the device in several sizes corresponding to the focal lengths of objectives commonly used in hand cameras so that the purchaser may use his own camera lens. When either frame is focused on infinity it corresponds to the zero of its graduation of enlargement factors, as may be seen by making the factor $n$ equal to zero in formulæ (8) and (9). This zero is shown marked in Fig. 11 for frame O', although it can never serve after the linkage has been mounted and adjusted except as an aid in making the graduation. The graduation, however, if required, may be so easily made, by direct measurement of the image after the linkage has been mounted and adjusted to focus, that no other method need be used.

*Modified forms.*—By referring to Fig. 3, it will be seen that the lens axis D is connected to the image axis A by a crank and pitman connection or two unequal links which form a triangle A B D, and that the lens axis D' is connected to the other image axis A' by two similar unequal links forming another triangle A' B' D'; also that the bases A D, A' D' of these two triangles are variable and are caused to vary together by employing means to compel the angle $a$ opposed to the longer link in triangle A B D, and the angle $a'$ opposed to the longer link in triangles A' B' D' to remain supplementary, that is, to always form two right angles when added. The angles $b$ and $b'$ opposed to the shorter links, therefore, also vary, but remain equal. A great number of other types may be derived either with or without shift, by changing the position of these same triangles on their base lines. Thus, as seen in Fig. 13, triangle A B D may, without any change in length or position of its base A D, be set in either one of the four different positions indicated by 1, 2, 3, and 4; and triangle A' B' D' may similarly be set in four different positions 1', 2', 3', 4'. The positions referred to by odd numbers are those in which the shorter link is connected with the lens, and the positions referred to by even numbers are those in which the longer link is connected with the lens. Any one of the four triangles on base A D may be used in combination with any one of the four triangles on base A′ D′; and, furthermore, any number of the six remaining triangles shown may be added to the combination, if desired. Thus by taking 2 and 4′ the linkage of Fig. 14 is formed. Here the link 60 is produced as a lever to V and joined to B by a link 61 equal to D D′ to form the parallelogram B D D′ V and compel the angles $b$ and $b'$ to remain equal. By a shift of the triangles, such as that made to pass from the type of Fig. 3 to the type of Fig. 4, this linkage of Fig. 14 becomes the very simple form shown in Fig. 15, which may be considered as typical of those forms of the linkage in which the image links are both short links, while Figs. 3 and 4 are typical of the forms in which the image links are both long links.

A form in which both long and short links are connected to the same axis is shown in Fig. 16. This is formed by taking triangles 2, 3, 3′ and 4′ of Fig. 13. This linkage may be considered as the linkages of Figs. 4 and 15 combined to coöperate, and it has the advantage that its pivot axes A, D and A′ will remain in perfect alinement without a slideway because point A′, for instance, is connected to points A and D by truss connection and is thus held in alinement with them, so that no useless side pressures are put on the slides and very smooth action is secured. To permit of clearly distinguishing the two sets of linkage, one set is shaded with horizontal lines.

By taking triangles 1, 3, 1′ and 3′ of Fig. 13 the compound linkage of Fig. 17 is formed, and by duplicating the linkage of Fig. 15, and reversing about an axis perpendicular to A A′ in the plane of the drawing, the linkage of Fig. 18 is formed.

The forms of Figs. 17 and 18 are both old as elements in straight line or so-called parallel motion mechanism. Fig. 17, for instance, comprises six of the seven links used in Peaucellier's beam, in the special form of it, shown in Fig. 413, p. 501, of Klein's translation of Weisbach's "*Mechanics of Engineering*," Vol. III, Part I, section 1, New York, 1883.

All the linkages shown in the drawings merely serve to form a crank and pitman connection between the lens and either image plane and to cause the two connections to move so that the angles $a$ and $a'$ opposed to the longer links shall be and remain supplementary, this being the fundamental principle of my invention. Any linkage, therefore, containing links that satisfy these conditions may be used, provided the links thereof that correspond to my crank and pitman are proportioned to satisfy the conditions involved in equation (1). However, forms of the type shown in 15, 16, 17 and 18 are not directly applicable to the arrangements of Figs. 1 and 2 or to that of Figs. 7 to 12 because a part of these linkages would be interfered with by the lens frame. To avoid this difficulty, I mount them on either side of the camera; or horizontally on top and on the bottom of the camera. When mounted on the top or on the bottom, one set is sufficient. An arrangement which is suitable for any side of the camera is shown in Figs. 19 to 22, as applied to the bottom. The bed here comprises two parallel bars 200, 201, connected at their ends to cross pieces 202, 203, which serve as feet. At the middle the bars have a solid cross piece 204 which is adapted to support the lens pintle 205 which is made with an integral collar or shoulder 206 and held solidly by a nut 207 at its upper end. At the lower end the pin 205 has a cotter or pin 208 by means of which the linkage is to be held on the pin. Close to bar 204 is rigidly fastened a bridge piece 209 upon which is firmly screwed the lens frame $L^3$ as shown. As seen in Fig. 22, this bridge piece is intended to form a space under the lens frame to leave the way clear for the carriages 220, 230. The carriage 220 carries the object frame $O^3$ and carriage 230 carries the image frame $I^3$. Carriage 220 has lateral rectangular grooves formed by flanges 221 adapting it to fit and slide freely along in the bars 200, 201. The flanges 221 are carried around and at the lens end of the carriage are extended to form bearings 222 for the image pin 223 which is held in place by a cotter or pin 224. Through the body of the carriage 220 is formed a large rectangular opening 225, Fig. 20, the longer walls of which act as a guideway for a block 226 upon which is firmly mounted the object frame $O^3$. This block carries a cap screw 227 which is threaded into a cross-bar 228. The frame $O^3$ may be set where desired on carriage 230 by first loosening screw 227 and then tightening it. Carriage 230 is in every respect similar to carriage 220. Its parts 231 to 238 correspond exactly to the correspondingly numbered parts 221 to 228 of carriage 220.

By removing all the three pins 205, 223, 233 either carriage may be pushed in to bring its axis A or A′ into coincidence with axis D. Frames $I^3$ and $O^3$ may, therefore, be set each in proper relation to its respective axis by the method of focusing on infinity as set forth above in connection with Figs. 7 and 12. The only difference to be noted between the adjustments of Fig. 7 and those of Fig. 19 is that in Fig. 7 the bearing is adjustable on the slide, while in Fig. 19 it is the image frame that is adjustable on the slide.

In the structure of Figs. 19 to 22 any one of the linkages shown in the drawings may be used. If that of Fig. 17 be used its two lens links should be made adjustable and the linkage may evidently be mounted and adjusted as explained in connection with Fig. 12.

In all forms shown the lens frame is the stationary frame, but it will be understood that either of the image frames may be stationary instead without any change in principle.

The method of positioning the axes A, D, A' as given above is so involved with the mechanical structure that a simpler exposition freed of all mechanical features seems to be needed to surely prevent any misunderstanding of the nature and scope of the invention.

The following principles should clearly be understood:

First. Each of the three connecting points or axes A, D, A' considered *per se* may occupy any desired position on its respective frame. The word "frame" is here used to designate the frame itself or any part rigidly connected with it, and, therefore, connecting point A, Fig. 1, might occupy any position on its frame O, even far to the left of O, if desired, or above it; point D similarly any desired position on frame L; and point A' any desired position on its frame I. This feature is of considerable theoretical importance and is extremely valuable from a practical standpoint because of the great latitude it gives for designing forms suited to special cases;

Second. The positioning of any one point on its frame predetermines the position of the other two points on their frames; that is to say: if point A be positioned on its frame O, the position of D on its frame L and that of A' on its frame I will be dependent upon the position first selected for A on frame O; or generally the position of any two of the three connecting points A, D, A' will depend upon the position selected for the first positioned point, which, therefore, serves as the "fiducial" mark referred to above to determine the other points.

Third. The fiducial or first positioned "connecting point" may be non-adjustable, reducing the strictly necessary adjustments to two. Point D, for instance, in all forms herein illustrated is the non-adjustable point, but either A or A' might be the non-adjustable point instead; and all three might be made adjustable, if desired.

Fourth. The position of the lens-point D is virtually defined by its distances $x$ and $x'$ (Fig. 23) from the focal planes F, F'. The latter are very easily determined by focusing on infinity and this does away with all the uncertainties involved in the use of the focal length of the lens, of its nodal points N, N' or of the so-called "optical center," which has no definite meaning when applied to the compound lenses used in photography, and is of no utility for present purposes even as applied to simple lenses. To bring out this feature as clearly as possible in both Figs. 23 and 24, the lens is simply represented by its two focal planes F, F', which are the only lens elements directly utilized in my method.

Fifth. The three connecting points A, D, A' or their axes produced will coincide when the two end frames are set in focus on infinity. The reason for this has already been given above, but may further be elucidated by reference to Fig. 23, which is a simplified form of Fig. 4, and where point D may be considered as being virtually connected with the focal planes F', F, of the lens by rigid bars $x$, $x'$. Removing the linkage and bringing P up into coincidence with F, Fig. 24, to focus P on infinity, simultaneously brings A into coincidence with D, clearly showing the identity of $x$ and $m$. The identity of $x'$ and $m'$ is similarly shown by focusing P' on infinity or bringing P' up to focus F' and A' into coincidence with D. Now, let the three camera frames $O^4$, $L^4$, $I^4$ be drawn to scale on paper as in Fig. 25 with the two end frames spaced as they are when focused on infinity, or as having P coincident with F, and P' with F'. According to the principles disclosed above, the three connecting axes A, D, A' will coincide in one point which the designer is left free to plot anywhere at will. A simple dot A, D, A', Fig. 25, made on any point of the paper, regardless of the positions of the frames on the paper, determines the three corresponding relative positions $m$, $z$, $m'$ of three axes A, D, A' that may be used as connecting points. In Fig. 26 the same three frames of Fig. 25 are separated to show the three different relative positions $m$, $z$, $m'$ as clearly as possible.

In conclusion, let it, furthermore, be noted that the novel principles disclosed above for positioning the connecting points constitute a radical departure in the art and are applicable, directly or with slight modification, to all types of focusing mechanism, as any such mechanism necessarily determines co-varying space elements forming a constant product equal to the second power of the focal length of the lens in accordance with Newton's formula. My Fig. 3 is a direct structural embodiment of such formula, and all my other forms are mathematical equivalents of such direct embodiment. In my adjustable and really practical forms, by focusing on infinity to position two of the three connecting points, A, D, A′, direct structural use is made of the principal focal planes F, F′ and it is this entirely novel step that enables the operator, first, to pay no attention whatever to the location of the nodal points N and N′ with relation to the lens frame; and, secondly, to disregard the internodal distance N N′, however large it may be. Thus are avoided all the inaccuracies and perplexing difficulties involved in the use of optical centers. The "optical center" strictly speaking is a point located in the mathematical "glass space" of a simple lens, and is not to be confounded with either of the nodal points N, N′, which are, respectively, located in the "object air space" and "image air space" of the lens, and which are alone used, even in simple lenses, for plotting the images. All lenses, whether simple or compound, have these two centers or "air points" N and N′, which have between them an internodal distance N N′, that may in certain rare instances be *nil*, but that is more often finite, even in simple lenses. As seen in the drawings it is positive, but it frequently is negative (when the points N N′ are spoken of as crossed) and in either case it may be numerically greater than the focal length of the lens. Whatever the value of this internodal distance N N′ may be, the operator who follows my methods of adjustment will unconsciously, but very accurately, make due allowance for it. The adjustments are the same and just as convenient for an unsymmetrical lens, having its nodal points N, N′ at a considerable distance in front of the lens and lens mount, as they are for any other lens.

Assuming one of my adjustable cameras (Fig. 7 or Fig. 19) to have been fully regulated and adjusted for use with a given lens X, it will be seen that no other lens Y can be substituted for X, without readjustment, unless the second lens Y satisfies each and every one of the three following conditions: First, the left hand focal plane F of the second lens Y must exactly coincide with the left hand focal plane F of the first lens X; second, the right hand focal plane F′ of the second lens Y must exactly coincide with the right hand focal plane F′ of the first lens X; third, the focal length F N, N′ F′ of the second lens Y must be exactly equal to the focal length F N, N′ F′ of the first lens X. Lenses that do not agree precisely and exactly in each and every one of these three particulars are different lenses requiring different adjustments; and it is safe to assume that lenses are probably different in the present sense, even when they are of the same make, and of the same type, and nominally of the same focal length; or apparently identical in every respect. No better proof of a probable dissimilarity is required than the extra charge that is invariably made for paired high grade lenses which are to be used together in stereoscopic work. The advantage of my adjustable forms, therefore, is not merely that they permit of using lenses differing in focal length, but mainly, first, that they provide compensation for any of the differences which are more or less present in all lenses; second, that they provide this compensation in such manner as to dispense with the necessity of even knowing what the existing differences may be; third, that they, in all cases, permit of very easily and very quickly securing the highest attainable precision of coöperation of the focusing gear with any given lens. Such are my reasons for referring to the adjustable forms of my invention as the "really practical forms."

As introductory to the claims, it is noted that considerable confusion has been produced in the art of copying or enlarging cameras by using the term "adjustment" to designate the relative displacements of the three camera frames O, L, I, and that the confusion is avoided in the present specification by strictly limiting the use of the same term "adjustment" to changes in structural dimensions, such as dimensions B D and dimension *m*, that remain fixed and invariable after the camera has once been regulated for use with a given lens. Moreover, the term "frame" in the expressions "object frame," "lens frame" and "image frame" is used in the claims, in the preamble, and other parts of the specification as meaning any material part that must be used to support the element referred to and that remains throughout all adjustments in fixed relative position to such supported element.

Having thus described my invention, what I claim is:—

1. The method of positioning on their respective frames the three connecting points that connect the mechanical focusing gear with the lens frame and the two end frames of a mechanically or automatically focused copying or enlarging camera, which consists in: first taking the lens frame and one of the end frames and positioning the connecting point of one of these first two frames at will; second, setting these first two frames at the proper distance apart to place them in focal relation on infinity, and using the first positioned connecting point as a fiducial point for positioning the connecting point of the second one of these first two frames; third, taking the said lens frame and the third frame and setting them at the proper distance apart to place them in focal relation on infinity, and using the positioned connecting point of the lens frame as a fiducial point for positioning the connecting point of the said third frame.

2. The method of positioning on their respective frames the three connecting points that connect the mechanical focusing gear with the lens frame and the two end frames of a mechanically and automatically focused copying or enlarging camera, which consists in: first positioning the connecting point of the lens frame at will; second, taking the said lens frame and one of the end frames and setting them at the proper distance apart to place them in focal relation on infinity, and using the connecting point of the said lens frame as a fiducial point for positioning the connecting point of the said end frame; third, taking the same said lens frame and the remaining end frame and setting them at the proper distance apart to place them in focal relation on infinity, and using the connecting point of the said lens frame as a fiducial point for positioning the connecting point of the said remaining end frame.

3. The method of positioning on their respective frames the three pivotal axes connecting the mechanical focusing gear with the lens frame and the two end frames of a mechanically and automatically focused copying and enlarging camera, which consists in: first, taking the lens frame and one of the end frames and positioning the pivotal axis of one of these first two frames, as the axis of the first frame, at will; second, bringing the pivotal axis of the second frame into coincidence with the positioned axis of the said first frame and setting these first two frames at the proper distance apart to place them in focal relation on infinity, also fixing the pivotal axis of the said second frame to the second frame in the relative position so determined; third, taking the lens frame and the remaining end frame and bringing their pivotal axes into coincidence and setting the said lens frame and the said remaining end frame at the proper distance apart to place them in focal relation on infinity, also fixing the pivotal axis of the said remaining end frame to the said remaining frame in the relative position so determined.

4. The method of positioning on their respective frames the three pivotal axes connecting the mechanical focusing gear with the lens frame and the two end frames of a mechanically and automatically focused copying or enlarging camera, which consists in: first, positioning the pivotal axis of the said lens frame; second, taking the said lens frame and one of the end frames and bringing the pivotal axis of the said end frame into coincidence with the pivotal axis of the said lens frame, also fixing said second pivotal axis to its said end frame in the relative position so determined; third, taking the said lens frame and the remaining end frame and bringing the pivotal axis of the said remaining end frame into coincidence with the axis of the said lens frame, also fixing said third pivotal axis to its said remaining end frame in the relative position so determined.

5. The method of positioning on their respective frames the three connecting points, that connect the mechanical focusing gear with the lens frame and the two end frames of a mechanically or automatically focused copying or enlarging camera, which consists in positioning one of the said three connecting points on its frame at will and using such positioned connecting point as a fiducial point for determining the positions of the other two connecting points by focusing on infinity.

6. The method of adjusting and regulating a copying or enlarging camera having automatic focusing mechanism adapted to determine two variable space elements P F, F' P', co-varying in accordance with Newton's formula; which method consists: first, in adjusting point connections of the said mechanism with the camera frames, by focusing on infinity; and, secondly, in then adjusting dimensions of the focusing mechanism itself by focusing one end frame on the other at a finite distance.

7. The method of adjusting and regulating a copying or enlarging camera having automatic focusing mechanism adapted to determine two variable space elements P F, F' P', co-varying in accordance with Newton's formula; which method consists: first, in setting the lens frame and one end frame in focal relation on infinity; second, in setting parts of the focusing mechanism which correspond to the said two frames in the relative position that they would occupy if such mechanism could be used to carry the other end frame to infinity; third, after steps 1 and 2 have been executed in the order named or in reverse order, finally, clamping or fastening said focusing parts to their respective frames in the relative positions that they occupy after the first two steps.

8. In a copying or enlarging camera having automatic focusing gear, the indirect method of determining the dimension of an adjustable connection to be established between a camera frame and its appropriate but still free gear part, which method consists: first, in taking such camera frame with its gear part free and another camera frame with its gear part previously fixed, and setting such two camera frames in a relative position defined by the corresponding value of the copying factor; secondly, setting the two said gear parts independently of their frames in the relative position corresponding to the same copying factor value; thirdly, after steps 1 and 2 have been executed in the order named or in reverse order, finally fixing the thus self determined dimension of the said adjustable connection.

9. The method of automatically determining the dimensional adjustment of a normally rigid but adjustable structural element in the focusing mechanism connecting the object frame, lens frame, and image frame of a copying or enlarging camera, such method being composed of a series of steps in the course of which the frames that are involved in the adjustment are set in focus on infinity.

In testimony whereof I have signed my name to this specification in the presence of two subscribing witnesses.

JOSEPH BECKER.

Witnesses:
PARKER DODGE,
JAMES L. CRAWFORD.

---

Corrections in Letters Patent No. 1,103,343.

It is hereby certified that in Letters Patent No. 1,103,343, granted July 14, 1914, upon the application of Joseph Becker, of Washington, District of Columbia, for an improvement in "Methods of Adjusting and Regulating Automatically-Focused Enlarging or Copying Cameras," errors appear in the printed specification requiring correction as follows: Page 4, line 73, formula, second symbol for "G' P'" read $\frac{TN}{G'P'}$; page 9, line 95, for the word "dimensions" read *dimension;* and that the said Letters Patent should be read with these corrections therein that the same may conform to the record of the case in the Patent Office.

Signed and sealed this 11th day of August, A. D., 1914.

[SEAL.]

J. T. NEWTON,

*Acting Commissioner of Patents.*

---

Corrections in Letters Patent No. 1,103,343.

It is hereby certified that in Letters Patent No. 1,103,343, granted July 14, 1914, upon the application of Joseph Becker, of Washington, District of Columbia, for an improvement in "Methods of Adjusting and Regulating Automatically-Focused Enlarging or Copying Cameras," errors appear in the printed specification requiring correction as follows: In the correction slip dated August 11, 1914, cancel all the amendments therein noted, to be replaced by the following more definite amendments: In the specification, page 4, lines 72-74, for the third equation member "G' P'" read $\frac{TN}{G'P'}$; page 9, line 95, for "dimensions BD" read *dimension BD;* and that the said Letters Patent should be read with these corrections therein that the same may conform to the record of the case in the Patent Office.

Signed and sealed this 13th day of October, A. D., 1914.

[SEAL.]

J. T. NEWTON,

*Acting Commissioner of Patents.*